US012671574B2

(12) United States Patent
Ugajin et al.

(10) Patent No.: US 12,671,574 B2
(45) Date of Patent: Jun. 30, 2026

(54) COMMUNICATION APPARATUS, COMMUNICATION METHOD, AND STORAGE MEDIUM

(71) Applicants: Yusuke Ugajin, Kanagawa (JP); Hiroshi Kato, Kanagawa (JP); Hajime Takayama, Tokyo (JP); Shu Yanai, Kanagawa (JP)

(72) Inventors: Yusuke Ugajin, Kanagawa (JP); Hiroshi Kato, Kanagawa (JP); Hajime Takayama, Tokyo (JP); Shu Yanai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 95 days.

(21) Appl. No.: 18/567,377

(22) PCT Filed: Jun. 27, 2022

(86) PCT No.: PCT/IB2022/055920
§ 371 (c)(1),
(2) Date: Dec. 6, 2023

(87) PCT Pub. No.: WO2023/281343
PCT Pub. Date: Jan. 12, 2023

(65) Prior Publication Data
US 2024/0267202 A1 Aug. 8, 2024

(30) Foreign Application Priority Data

Jul. 5, 2021 (JP) ................................. 2021-111273
Jun. 20, 2022 (JP) ................................. 2022-098866

(51) Int. Cl.
*H04L 9/08* (2006.01)
*H04L 9/40* (2022.01)

(52) U.S. Cl.
CPC ............ *H04L 9/0819* (2013.01); *H04L 63/08* (2013.01)

(58) Field of Classification Search
CPC ... H04W 12/06; H04W 12/04; H04W 12/041; H04L 9/3263; H04L 63/08; H04L 9/0819;
(Continued)

(56) References Cited

U.S. PATENT DOCUMENTS

2010/0235500 A1 9/2010 Shizuno
2011/0040992 A1 2/2011 Mizunashi
(Continued)

FOREIGN PATENT DOCUMENTS

CN 112580051 A 3/2021
JP 2010219605 A 9/2010
(Continued)

OTHER PUBLICATIONS

Machine translation of the specification for CN112580051 (A) Pulled from Espacenet (Year: 2021).*
(Continued)

*Primary Examiner* — Benjamin A Kaplan
(74) *Attorney, Agent, or Firm* — XSENSUS LLP

(57) ABSTRACT

A communication apparatus includes a main system configured to perform first authentication processing and a subsystem configured to perform second authentication processing. The main system includes an authentication control unit configured to control the main system or the subsystem to perform authentication processing for connecting to a network. The main system includes a power saving control unit configured to control the main system to transition to a power saving state from a normal state, in which the main system performs the first authentication processing. The subsystem includes a communication unit configured to transmit and receive data through the network. The subsys-
(Continued)

tem includes an event processing unit configured to, in response to occurrence of a predetermined event relating to connection to the network when the main system is in the power saving state, process the predetermined event without controlling the main system to transition to the normal state.

15 Claims, 8 Drawing Sheets

(58) Field of Classification Search
CPC ..... H04L 9/3273; H04L 2209/80; H04L 9/08; Y02D 30/70
See application file for complete search history.

(56) References Cited

U.S. PATENT DOCUMENTS

| | | | |
|---|---|---|---|
| 2013/0053077 | A1 | 2/2013 | Barbieri et al. |
| 2013/0243467 | A1 | 9/2013 | Yamanishi et al. |
| 2014/0101433 | A1* | 4/2014 | Tanaka ................. G06F 1/3293 |
| | | | 713/100 |
| 2017/0054534 | A1 | 2/2017 | Sang et al. |

FOREIGN PATENT DOCUMENTS

| | | | |
|---|---|---|---|
| JP | 2010-283696 | A | 12/2010 |
| JP | 2011-041152 | A | 2/2011 |
| JP | 2014-085807 | A | 5/2014 |
| JP | 2015-085635 | A | 5/2015 |
| JP | 2017-050601 | A | 3/2017 |

OTHER PUBLICATIONS

International Search Report and Written Opinion issued on Sep. 22, 2022 in PCT/IB2022/055920 filed on Jun. 27, 2022, 11 pages.
Office Action issued Dec. 9, 2025 in Japanese Patent Application No. 2022-098866, 6 pages.

* cited by examiner

COMMUNICATION APPARATUS, COMMUNICATION METHOD, AND STORAGE MEDIUM

CROSS-REFERENCE TO RELATED APPLICATIONS

This patent application is based on PCT filing PCT/IB2022/055920, filed Jun. 27, 2022, which claims priority from Japanese Patent Application Nos. 2021-111273, filed Jul. 5, 2021, and 2022-098866, filed Jun. 20, 2022, the entire disclosures of each are hereby incorporated by reference herein.

TECHNICAL FIELD

The present disclosure relates to a communication apparatus, a communication method, and a storage medium.

BACKGROUND ART

A communication apparatus including a main system and a subsystem is known, in which the subsystem sends a response on behalf of the main system that is a power saving state, thus reducing power consumption.

For example, Patent Literature (PTL) 1 discloses that a subsystem performs processing on a normal data frame received through a wireless local area network (LAN) communication. PTL 1 further discloses that in response to data frame relating to an update of an encryption key, the subsystem sends an activation request to a main system and the activated main system performs processing on the data frame relating to the update of the encryption key.

CITATION LIST

Patent Literature

[PTL 1]
Japanese Unexamined Patent Application Publication No. 2017-050601

SUMMARY OF INVENTION

Technical Problem

In the technology discloses in PTL 1, for example, in a communication system such as a wireless LAN system in which encryption key update processing is executed at regular intervals, the main system has to return from a power saving state each time the encryption key update processing is executed.

To address the above-described issue, an embodiment of the present invention includes a communication apparatus including a main system and a subsystem that reduces the main system's transition from a power saving state in response to a predetermined event such as an update processing of an encryption key.

Solution to Problem

An example embodiment of the present disclosure includes a communication apparatus including a main system configured to perform first authentication processing and a subsystem configured to perform second authentication processing. The main system includes an authentication control unit configured to control the main system or the subsystem to perform authentication processing for connecting to a network. The main system includes a power saving control unit configured to control the main system to transition to a power saving state, in which the communication apparatus consumes power that is lower than power consumed when the communication apparatus is in a normal state, in which the main system performs the first authentication processing. The subsystem includes a communication unit configured to transmit and receive data through the network. The subsystem includes an event processing unit configured to, in response to occurrence of a predetermined event relating to connection to the network when the main system is in the power saving state, process the predetermined event without controlling the main system to transition to the normal state.

Another example embodiment of the present disclosure includes a communication method performed by a communication apparatus including a main system configured to perform first authentication processing and a subsystem configured to perform second authentication processing. The method includes controlling, by the main system, the main system or the subsystem to perform authentication processing for connecting to a network. The method includes controlling, by the main system, the main system to transition to a power saving state, in which the communication apparatus consumes power that is lower than power consumed when the communication apparatus is in a normal state, in which the main system performs the first authentication processing. The method includes transmitting and receiving, by the subsystem, data through the network. The method includes, in response to occurrence of a predetermined event relating to connection to the network when the main system is in the power saving state, processing, by the subsystem, the predetermined event without controlling the main system to transition to the normal state.

Another example embodiment of the present disclosure includes a storage medium storing a program storing instruction, which, when executed by one or more processors of a communication apparatus including a main system configured to perform first authentication processing and a subsystem configured to performing second authentication processing, to perform a method. The method includes controlling, by the main system, the main system or the subsystem to perform authentication processing for connecting to a network. The method includes controlling, by the main system, the main system to transition to a power saving state, in which the communication apparatus consumes power that is lower than power consumed when the communication apparatus is in a normal state, in which the main system performs the first authentication processing. The method includes transmitting and receiving, by the subsystem, data through the network. The method includes in response to occurrence of a predetermined event relating to connection to the network when the main system is in the power saving state, processing, by the subsystem, the predetermined event without controlling the main system to transition to the normal state.

Advantageous Effects of Invention

According to one or more embodiments of the present disclosure a communication apparatus including a main system and a subsystem is provided that reduces the main system's transition from a power saving state in response to a predetermined event such as an update processing of an encryption key.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
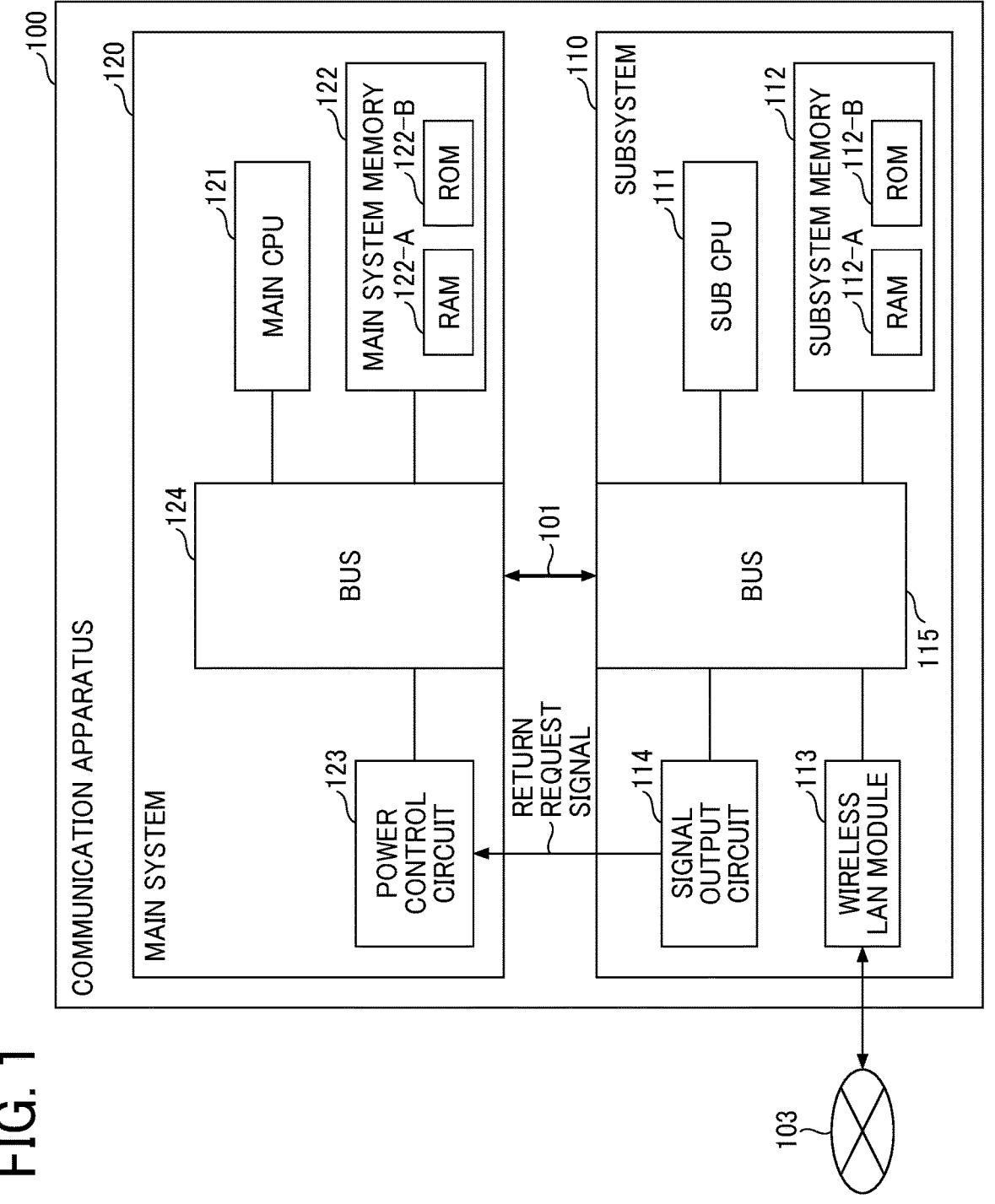
FIG. 1 is a diagram illustrating an example of a hardware configuration of a communication apparatus, according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present invention are described.

Example of Configuration of Communication Apparatus

FIG. 1 is a diagram illustrating an example of a hardware configuration of a communication apparatus 100 according to an embodiment. Examples of the communication apparatus 100 include, but are not limited to, an information processing apparatus and an electronic apparatus. Further, the communication apparatus 100 connects to a network 103 such as a wireless local area network (LAN). The communication apparatus 100 has multiple power consumption states. Examples of the multiple power consumption states include, but are not limited to, a normal state and a power saving state. In the normal state, the communication apparatus ratus 100 performs predetermined functions. In the power saving state, the communication apparatus 100 consumes less power than in the normal state. The communication apparatus 100 is, for example, an information processing apparatus or an electronic apparatus having a power saving capability of transitioning between the normal state and the power saving state.

The communication apparatus 100 can be any suitable apparatus, provided that it is connected to the network 103 and having the power saving capability as described above. Examples of the communication apparatus 100 include, but are not limited to, an image forming apparatus such as a printer or a multifunction peripheral (MFP) and an electronic device such as a projector (PJ) or an interactive white board (IWB), which is an electronic whiteboard capable of intercommunication. In another example, the communication apparatus 100 includes an output device such as a digital signage, a head up display (HUD), an industrial machine, an imaging device, a sound collecting device, a medical device, a networked home appliance, a car (connected car), and an in-vehicle device. In still another example, the communication apparatus 100 includes a laptop computer, a mobile phone, a smartphone, a tablet terminal, a game console, a personal digital assistant (PDA), a digital camera, a wearable personal computer (PC), and a desktop PC.

As illustrated in FIG. 1, the communication apparatus 100 includes a subsystem 110 and a main system 120. The subsystem 110 exchanges data with extraneous sources through the network 103. The subsystem 110 includes a sub central processing unit (CPU) 111, a subsystem memory 112, a wireless LAN module 113, a signal output circuit 114, and a bus 115.

The sub CPU 111 is a processor (arithmetic unit) that executes a predetermined program stored in the subsystem memory 112, for example, to control operation of the subsystem 110.

The subsystem memory 112 includes a random access memory (RAM) 112-A, which is a volatile memory, and a read only memory (ROM) 112-B, which is a nonvolatile memory. The RAM 112-A is used as a work area for the sub CPU 111, for example. The ROM 112-B stores in advance a predetermined program including a program to boot the sub CPU 111. In another example, the subsystem memory 112 include a storage device such as a solid state drive (SSD) or a flash ROM.

The wireless LAN module 113 is a device that exchanges data with extraneous sources through the network 103. The wireless LAN module 113 includes, for example, a wireless unit, which transmits and receives wireless signals, an antenna, and a media access control (MAC) controller.

The signal output circuit 114 is a circuit that outputs a return request signal for requesting the main system 120 to return from the power saving state under control of the sub CPU 111. The bus 115 is connected to each of the components of the subsystem 110 and transmits, for example, an address signal, a data signal, and various control signals.

The main system 120 includes a main CPU 121, a main system memory 122, a power control circuit 123, and a bus 124. The main system 120 executes various functions of the communication apparatus 100. Examples of the functions include, but are not limited to, image forming processing, output processing, and display processing.

The main CPU 121 is a processor (arithmetic unit) that executes a predetermined program stored in the main system memory 122, for example, to control operation of the main system 120.

The main system memory 122 includes a RAM) 122-A, which is a volatile memory, and a ROM 122-B, which is a nonvolatile memory. The RAM 122-A is used as a work area for the main CPU 121, for example. The ROM 122-B stores in advance a predetermined program including a program to boot the main CPU 121. In another example, the main system memory 122 include a storage device such as an SSD or a flash ROM.

The power control circuit 123 controls the supply of power to the main system 120. For example, when the main system 120 (or the communication apparatus 100) transitions to the power saving state, the power control circuit 123 stops the supply of power to the main system 120. Further, the power control circuit 123 restarts supplying power to the main system 120, in response to receiving a return request signal that requests return to normal operation from the subsystem 110 in a state in which the main system is in the power saving state. In the communication apparatus 100, power is constantly supplied to the power control circuit 123 when the main system 120 is in the power saving state. The bus 124 is connected to each of the components of the main system 120 and transmits, for example, an address signal, a data signal, and various control signals.

The subsystem 110 and the main system 120 are connected to each other via a communication interface such as a high-speed serial interface (I/F) 101. In another example, any other suitable communication interface other than the high-speed serial interface is used as an interface for connecting the subsystem 110 and the main system 120 with each other.

In the normal state, both the main system 120 and the subsystem 110 of the communication apparatus 100 are operating. The communication apparatus 100 performs the functions of the communication apparatus 100 under control of the main system 120. By contrast, in the power saving state, only the subsystem 110 of the communication apparatus 100 are operating, and the main system 120 is not operating. The main system 120 has higher processing capability than the subsystem 110. On the other hand, the main system 120 consumes more power than the subsystem 110. With such a configuration, the communication apparatus 100 consumes significantly less power in the power saving state than the normal state.

Figure 2:
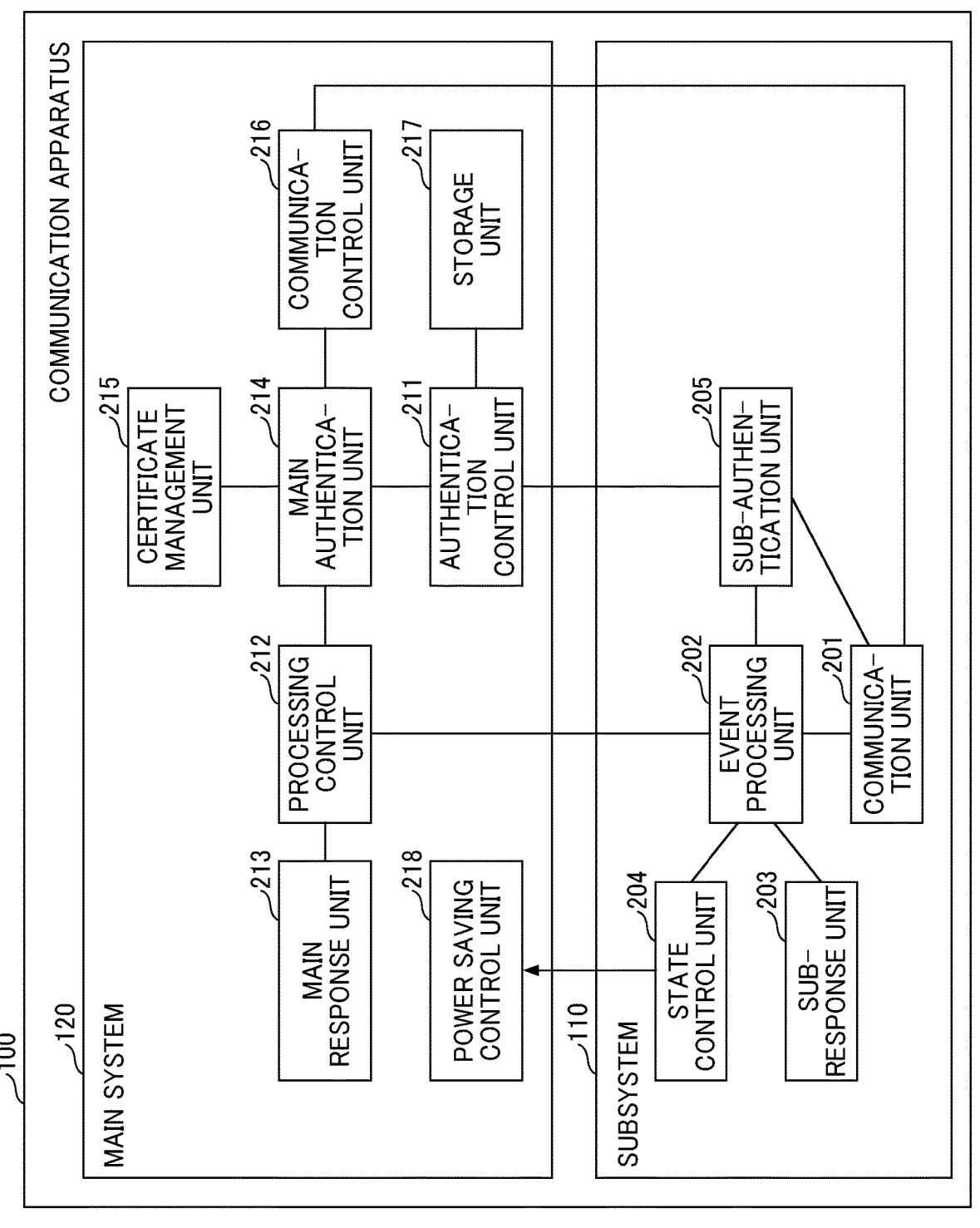
FIG. 2 is a diagram illustrating an example of a functional configuration of the communication apparatus, according to an embodiment of the present disclosure.

Functional Configuration:

FIG. 2 is a diagram illustrating an example of a functional configuration of the communication apparatus 100 according to an embodiment. The communication apparatus 100 includes the main system 120 capable of performing first authentication processing and the subsystem 110 capable of performing second authentication processing. The first authentication processing is an authentication processing using authentication method that requires processing relating to a digital certificate. Examples of the authentication method that requires processing relating to a digital certificate include, but are not limited to, Wi-Fi Protected Access (WPA)-Enterprise authentication. The second authentication processing is an authentication processing using an authentication method that does not require processing relating to a digital certificate. Examples of the authentication method that does not require processing relating to a digital certificate include, but are not limited to, an open authentication and Wi-Fi protected access2 pre-shared key (WPA2-PSK) authentication.

Functional Configuration of Subsystem:

The subsystem 110 includes a communication unit 201, an event processing unit 202, a sub-response unit 203, a state control unit 204, and a sub-authentication unit 205, each of which is implemented by the sub CPU 111 executing the predetermined program loaded from the subsystem memory 112. In another example, at least a part of the functional units is implemented by hardware.

The communication unit 201 performs communication processing of transmitting and receiving data through the network 103 by using the wireless LAN module 113.

The event processing unit 202 analyzes a data frame received by the communication unit 201 and determines a processing unit that is to process the data frame from the sub-response unit 203, the sub-authentication unit 205, and a processing control unit 212. The event processing unit 202 transfers the received data frame to the determined processing unit. For example, when the main system 120 is in the normal state, the event processing unit 202 transfers the received data frame to the processing control unit 212 of the main system 120. The data frame may also be referred to as a "packet".

Further, the event processing unit 202 determines whether the subsystem 110 can process the received data frame, when the main system 120 is in the power saving state. A detailed description is given later of details of the determination. When the event processing unit 202 determines that the subsystem 110 can process the received data frame, the event processing unit 202 causes the state control unit 204 to control the main system 120 to transition to the normal state. After the event processing unit 202 causes the main system 120 to transition to the normal state, the event processing unit 202 transfers the received data frame to the processing control unit 212 of the main system 120.

By contrast, when the event processing unit 202 determines that the main system 120 is in the power saving state and the subsystem 110 can process the received data frame, the event processing unit 202 transfers the received data frame to the sub-authentication unit 205 or the sub-response unit 203 depending on a type of the received data frame. For example, when the type of the received data frame is a type relating to authentication processing such as network connection processing or encryption key update processing, the event processing unit 202 transfers the received data frame to the sub-authentication unit 205. When the type of the received data frame is a type other than the type relating to the authentication processing, the event processing unit 202 transfers the received data frame to the sub-response unit 203.

The sub-response unit 203 processes the data frame received from the event processing unit 202 internally in the subsystem 110 and creates response data corresponding to the received data frame. Further, the sub-response unit 203 creates a data frame including the created response data and transmits the data frame to the event processing unit 202 as a response. In one example, the data frame processed by the sub-response unit 203 include information that can be stored in advance in the subsystem memory 112, such as request data for inquiring a state, an apparatus name, an individual identification number, or a function of the communication apparatus 100. For example, the RAM 112-A stores the state of the communication apparatus 100, and the ROM 112-B stores the apparatus name, the individual identification number, or the function of the communication apparatus.

The state control unit 204 transmits, under control of the event processing unit 202, a return request signal to the power control circuit 123 of the main system 120, cause the main system 120 to return (transition) from the power saving state to the normal state.

The sub-authentication unit 205 performs the second authentication processing using an authentication method that is executable by the subsystem 110. The sub-authentication unit 205 is an example of a second authentication unit. The second authentication processing includes, for example, connection processing to a wireless LAN access point or encryption key update processing using, for e example, an open authentication or WPA2-PSK authentication, which does not require processing relating to a digital certificate.

Functional Configuration of Main System:

The main system 120 includes an authentication control unit 211, the processing control unit 212, a main response unit 213, a main authentication unit 214, a certificate management unit 215, a communication control unit 216, a storage unit 217, and a power saving control unit 218, each of which is implement by the main CPU 121 executing the predetermined program loaded from the main system memory 122. In another example, at least a part of the functional units is implemented by hardware.

The authentication control unit 211 controls the main system 120 or the subsystem 110 to perform authentication processing for participating in the network 103. For example, the authentication control unit 211 controls the main authentication unit 214 or the sub-authentication unit 205 to perform connection processing with an access point depending on an authentication method that is set in the communication apparatus 100 and stored in the main system memory 122. In one example, when the authentication method stored in the storage unit 217 is an authentication method that does not require processing relating to a digital certificate, the authentication control unit 211 controls the subsystem 110 to performs the authentication processing for participating in the network 103. By contrast, when the authentication method stored in the main system memory 122 is an authentication method that requires processing relating to a digital certificate, the authentication control unit 211 controls the main system 120 to perform the authentication processing for participating in the network 103. Examples of the authentication method that does not require processing relating to a digital certificate include, but are not limited to, an open authentication and WPA2-PSK authentication. Examples of the authentication method that requires processing relating to a digital certificate include, but are not limited to, WPA-Enterprise authentication.

The processing control unit 212 controls the processing unit corresponding to the data frame to process the data frame received from the event processing unit 202. For example, when the received data frame is a data frame relating to authentication processing, the processing control unit 212 transfers the data frame to the main authentication unit 214. When the received data frame is a data frame other than the data frame relating to authentication processing, the processing control unit 212 transfers the data frame to the main response unit 213.

In response to receiving a response frame to the transferred data frame from the main authentication unit 214 or the main response unit 213, the processing control unit 212 transfers the response frame to the event processing unit 202.

The main response unit 213 creates a response frame responding to the data frame received from the processing control unit 212, and transmits the created response frame as a response to the processing control unit 212.

The main authentication unit 214 performs the first authentication processing using the authentication method that requires processing relating to a digital certificate, such as WPA-Enterprise authentication. The main authentication unit 214 is an example of a first authentication unit. For example, the main authentication unit 214 causes the communication control unit 216 to control the communication unit 201, to perform processing such as connection processing to an access point of a wireless LAN and encryption key update processing.

For example, when the authentication method of the wireless LAN is WPA2-Enterprise that uses Extensive Authentication Protocol Transport Layer Security (EAP-TLS), the main authentication unit 214 verifies a server certificate using a Certification Authority (CA) certificate read from the main system memory 122. Further, the main authentication unit 214 transmits a client certificate read from the main system memory 122 and performs mutual authentication to generate a pre-shared key. Furthermore, the main authentication unit 214 performs the 4-way handshake using the generated pre-shared key, thus completing the authentication processing. The 4-way handshake is a common procedure for exchanging an encryption key in a wireless LAN system or the like.

The certificate management unit 215 stores digital certificates such as the above-described CA certificate and client certificate in the main system memory 122 and manages these certificates. The communication control unit 216 is an interface used by the main authentication unit 214 to control the communication unit 201 from the main system 120.

The storage unit 217 is implemented by, for example, a program executed by the main CPU 121 and the main system memory 122. The storage unit 217 stores various data (or information) such as the digital certificates, the encryption key such as the pre-shared key, and the setting information of the authentication method described above in the main system memory 122.

The power saving control unit 218 is implement by, for example, a program executed by the main CPU 121 and the power control circuit 123. The power saving control unit 218 controls the main system 120 to transition to the power saving state at a predetermined timing. Examples of the predetermined timing include, but are not limited to, after the main system 120 or the subsystem 110 performs the authentication processing for participating in the network 103, or when an idle status continues for equal to or longer than a predetermined time period. In another example, the power saving control unit 218 starts up first when the power control circuit 123 starts supplying power to the main system 120 in response to the return request signal transmitted from the subsystem 110, and then activates other processing units.

Operation:

A description is now given of a processing flow of a communication method according to the present embodiment.

First Embodiment

Figure 3:
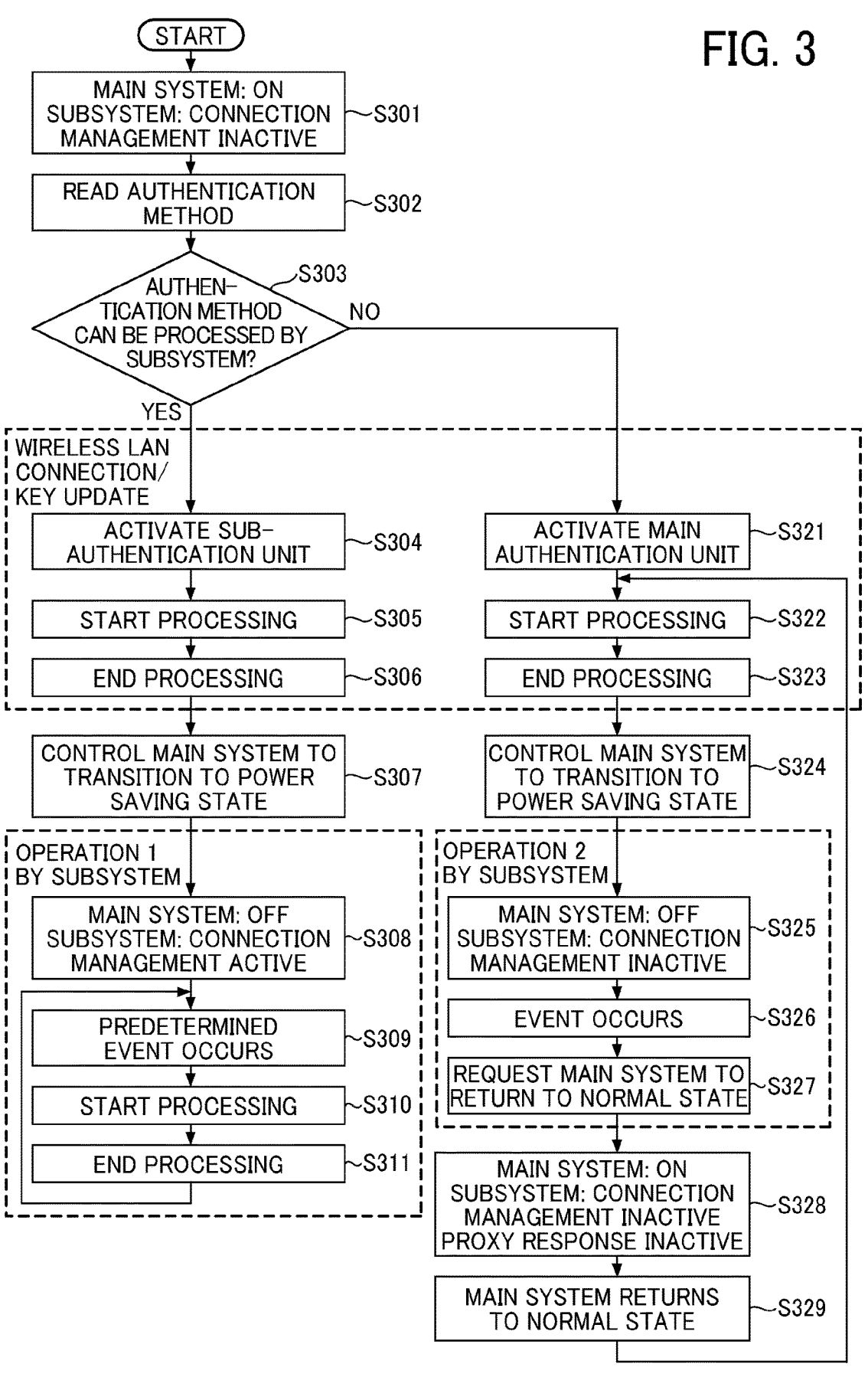
FIG. 3 is a flowchart illustrating an example of an operation performed by the communication apparatus, according to the first embodiment of the present disclosure.

FIG. 3 is a flowchart illustrating an example of an operation performed by the communication apparatus 100 according to the first embodiment. Referring to this drawing, among various processes performed by the communication apparatus 100, processes relating to authentication processing performed by the sub-authentication unit 205 and the main authentication unit 214 are mainly described.

In step S301, the main system 120 and the subsystem 110 start up. In this step, the event processing unit 202 of the subsystem 110 sets processing (connection management) by the sub-authentication unit 205 to be in an inactive state. The settings of the connection management are stored in the subsystem memory 112 by the event processing unit 202, for example.

In step S302, the authentication control unit 211 of the main system 120 reads an authentication method set in the communication apparatus 100 from the main system memory 122. In step S303, the authentication control unit 211 of the main system 120 determines whether the read authentication method is an authentication method that can be processed by the sub-authentication unit 205. For example, when the authentication method set in the communication apparatus 100 is an authentication method that does not require processing relating to a digital certificate, the authentication control unit 211 determines that the authentication method read in step S302 is an authentication method that can be processed by the subsystem 110. By contrast, when the authentication method set in the communication apparatus 100 is an authentication method that requires processing relating to a digital certificate, the authentication control unit 211 determines that the authentication method read in step S302 is an authentication method that cannot be processed by the subsystem 110. Examples of the authentication method that does not require processing relating to a digital certificate include, but are not limited to, an open authentication and WPA2-PSK authentication. On the other hand, examples of the authentication method that requires processing relating to a digital certificate include, but are not limited to, WPA2-Enterprise authentication.

When the authentication control unit 211 determines that the authentication method can be processed by the subsystem 110 (S303: YES), the operation proceeds to step S304. By contrast, when the authentication control unit 211 determines that the authentication method cannot be processed by the subsystem 110 (S303: NO), the operation proceeds to step S321.

In step S304, the authentication control unit 211 of the main system 120 activates the sub-authentication unit 205 of the subsystem 110. In this step, the authentication control unit 211 sets a passphrase read from the main system memory 122 in the sub-authentication unit 205. The passphrase is used to generate a pre-shared key. The passphrase is a combination of character strings and numbers. In one example, the passphrase is a password of equal to or less than 10 characters. The passphrase is set by a user or an administrator, for example, and stored in the main system memory 122.

In step S305, the sub-authentication unit 205 of the subsystem 110 starts authentication processing for participating in (connecting to) the network 103. In this step, the sub-authentication unit 205 processes a data frame for key exchange depending on the authentication method or an event unique to the wireless LAN. For example, when the authentication method is WPA2-PSK, the sub-authentication unit 205 generates a pre-shared key based on the passphrase set by the authentication control unit 211, and performs the 4-way handshake. The participation (connection) in the network 103 includes, for example, a wireless connection to an external access point.

When the authentication processing by the sub-authentication unit 205 is completed in step S306, the power saving control unit 218 of the main system 120 controls the main system 120 to transition to the power saving state in step S307. When the main system 120 transitions to the power saving state, the subsystem 110 performs Operation 1 by the subsystem as indicated in steps S308 to S311.

In step S308, the main system 120 is turned off (transitions to the power saving state). In this step, the event processing unit 202 of the subsystem 110 sets processing (connection management) by the sub-authentication unit 205 to be in an active state.

In steps S309 and S310, when a predetermined event relating to connection to the network 103 occurs, the event processing unit 202 starts to process the predetermined event internally by the subsystem 110 without the transition of the main system 120 to the normal state. For example, when the communication unit 201 receives a data frame for key exchange, the event processing unit 202 transfers the received data frame to the sub-authentication unit 205. The reception of the data frame for key exchange is an example of the predetermined event.

In response to receiving the data frame for key exchange from the event processing unit 202, the sub-authentication unit 205 performs encryption key update processing.

In step S311, when the processing by the sub-authentication unit 205 is completed, the operation returns to step S309, and the event processing unit 202 waits for an occurrence of the predetermined event.

With the above-described operation, when the authentication method set in the communication apparatus 100 is an authentication method that does not require processing relating to a digital certificate such as open authentication or WPA2-PSK authentication, the communication apparatus 100 processes the predetermined event such as encryption key update processing by the subsystem 110.

By contrast, when the operation proceeds from step S303 to step S321, the authentication control unit 211 of the main system 120 activates the main authentication unit 214 of the main system 120.

In step S322, the main authentication unit 214 of the main system 120 starts authentication processing for participating in (connecting to) the network 103. In this step, the main authentication unit 214 processes a data frame for key exchange depending on the authentication method or an event unique to the wireless LAN. For example, when the authentication method is WPA2-Enterprise using EAP-TLS, the main authentication unit 214 verifies a server certificate using the CA certificate read from the main system memory 122. Further, the main authentication unit 214 transmits the client certificate read from the main system memory 122 to performs mutual authentication, thus generating a pre-shared key. Furthermore, the main authentication unit 214 performs the 4-way handshake using the generated pre-shared key. The participation (connection) in the network 103 includes, for example, a wireless connection to an external access point.

When the authentication processing by the main authentication unit 214 is completed in step S323, the power saving control unit 218 of the main system 120 controls the main system 120 to transition to the power saving state in step S324. When the main system 120 transitions to the power saving state, the subsystem 110 performs Operation 2 by the subsystem as indicated in steps S325 to S327.

In step S325, the main system 120 is turned off (transitions to the power saving state). In this step, the event processing unit 202 of the subsystem 110 keeps the inactive state of the processing (connection management) by the sub-authentication unit 205.

When the predetermined event relating to the connection to the network 103 occurs in step S326, the event processing unit 202 causes the state control unit 204 to request the main system 120 to return to the normal state in step S327.

In step S328, the main system 120 is turned on (transitions to the normal state). In this step, the event processing unit 202 of the subsystem 110 keeps the inactive state of the processing (connection management) by the sub-authentication unit 205. Preferably, the event processing unit 202 sets the processing (proxy response) by the sub-response unit 203 to be in an inactive state. The setting of the proxy response is stored in the subsystem memory 112 by the event processing unit 202, for example.

When the main system 120 transitions from the power saving state to the normal state in step S329, the operation by the main system 120 returns back to step S322. For example, the event processing unit 202 of the subsystem 110 transfers the data frame for key exchange received by the communication unit 201 to the main authentication unit 214 via the processing control unit 212 of the main system 120.

In this case, the main authentication unit 214 of the main system 120 performs an encryption key update processing in step S322 in response to the data frame for key exchange received from the processing control unit 212.

With the above-described operation, the communication apparatus 100 performs processing using the main system 120 when an authentication method set in the communication apparatus 100 is an authentication method that requires processing relating to a digital certificate, such as WPA2-Enterprise using EAP-TLS. The first authentication processing that is performed by the main system 120 and that requires processing relating to a digital certificate is an example of a predetermined function that the communication apparatus 100 can perform in the normal state.

Second Embodiment

In the second embodiment, an example of operation performed when the main authentication unit 214 shares authentication information with the sub-authentication unit 205 is described.

Figure 4:
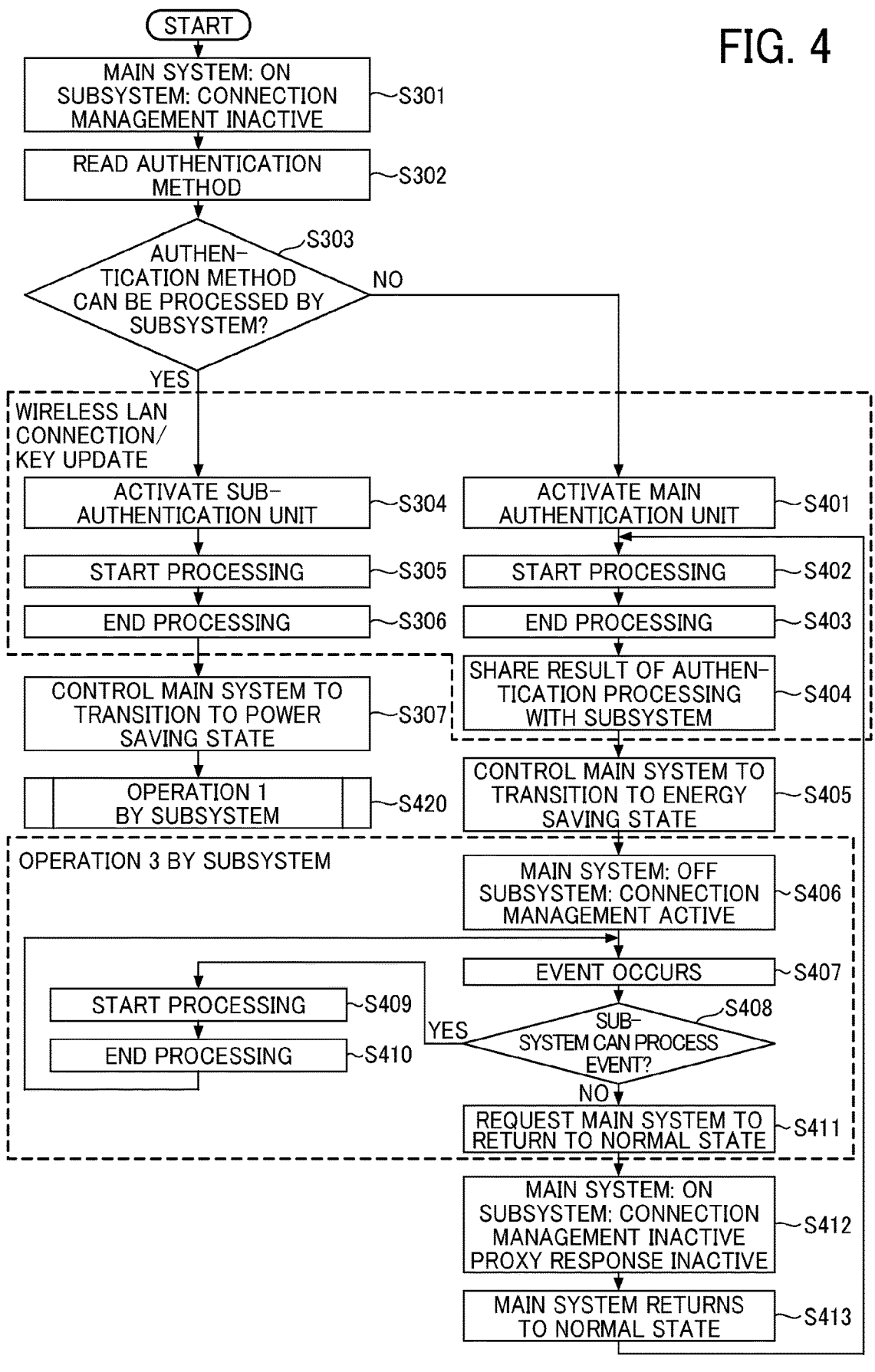
FIG. 4 is a flowchart illustrating an example of an operation performed by the communication apparatus, according to the second embodiment of the present disclosure.

FIG. 4 is a flowchart illustrating an example of an operation performed by the communication apparatus 100 according to the second embodiment. Processes of steps S301 to S307 and S420 in FIG. 4 are performed in the same or substantially the same manner as described with reference to FIG. 3 in the first embodiment, and redundant description thereof are omitted below to simplify the description. In step S420 of FIG. 4, the communication apparatus 100 performs Operation 1 by the subsystem as illustrated in steps S308 to S311 of FIG. 3. Detailed descriptions of the same or substantially the same processes as in the first embodiment are omitted below.

When the operation proceeds from step S303 to step S401, the authentication control unit 211 of the main system 120 activates the main authentication unit 214 of the main system 120.

In step S402, the main authentication unit 214 of the main system 120 starts authentication processing for participating in (connecting to) the network 103. This process is performed in the same or sustainably the same manner as the process of step S322 in FIG. 3.

When the authentication processing by the main authentication unit 214 is completed in step S403, the authentication control unit 211 of the main system 120 shares a result of the authentication processing by the main authentication unit 214 with the sub-authentication unit 205 of the subsystem 110 in step S404. For example, the authentication control unit 211 activates the sub-authentication unit 205, and notifies the sub-authentication unit 205 of authentication information such as the pre-shared key and the data frame encryption key generated in the authentication processing in step S402.

In step S405, the power saving control unit 218 of the main system 120 controls the main system 120 to transition to the power saving state. After controlling the main system 120 to transition to the power saving state, the subsystem 110 performs Operation 3 by the subsystem as illustrated in steps S406 to S411.

In step S406, the main system 120 is turned off (transitions to the power saving state). In this step, the event processing unit 202 of the subsystem 110 sets processing (connection management) by the sub-authentication unit 205 to be in an active state.

When a predetermined event relating to the connection to the network 103 occurs in step S407, the event processing unit 202 advances the operation to step S408.

In step S408, the event processing unit 202 determines whether the subsystem can process the predetermined event that has occurred. For example, when the event that has occurred is reception of a data frame for key exchange and an update of the encryption key does not include processing relating to a digital certificate, the event processing unit 202 determines that the subsystem can process the event that has occurred.

In the second embodiment, the sub-authentication unit 205 has already shared the authentication information with the main authentication unit 214. With such a configuration, even when the authentication method is WPA2-Enterprise and the event that has occurred is the reception of a data frame for key exchange, the event processing unit 202 determines that the subsystem 110 can process the event.

When the authentication method is WPA2-Enterprise, the encryption key is updated using 4-way handshake. This processing is performed using the same algorithm as the key exchange in the WPA2-PSK, and does not include processing for restoring the main system 120, such as verification of a service certificate.

When the subsystem 110 can process the event that has occurred, the event processing unit 202 advances the operation to step S409. By contrast, when the subsystem 110 cannot process the event that has occurred, the event processing unit 202 advances the operation to step S411.

In step S409, the sub-authentication unit 205 starts to process the data frame received from the event processing unit 202. For example, in response to receiving a data frame for key exchange from the event processing unit 202, the sub-authentication unit 205 performs 4-way handshake using the shared pre-shared key and the data frame encryption key, to acquire a new data frame encryption key.

When the processing by the sub-authentication unit 205 is completed in step S410, the operation returns to step S407, and the event processing unit 202 waits for another occurrence of the predetermined event.

By contrast, when the operation proceeds from step S408 to step S411, the event processing unit 202 causes the state control unit 204 to request the main system 120 to return to the normal state.

In step S412, the main system 120 is turned on (transitions to the normal state). In this step, the event processing unit 202 of the subsystem 110 sets processing (connection management) by the sub-authentication unit 205 to be in an inactive state. Preferably, the event processing unit 202 sets the processing (proxy response) by the sub-response unit 203 to be in an inactive state.

When the main system 120 transitions from the power saving state to the normal state in step S413, the operation by the main system 120 returns back to step S402. For example, the event processing unit 202 of the subsystem 110 transfers the data frame for key exchange received by the communication unit 201 to the main authentication unit 214 via the processing control unit 212 of the main system 120.

In this case, the main authentication unit 214 of the main system 120 performs an encryption key update processing in step S402 in response to receiving the data frame for key exchange from the processing control unit 212. In step S404, the main authentication unit 214 updates the authentication information shared with the sub-authentication unit 205.

With the above-described operation, the communication apparatus 100 according to the second embodiment processes the predetermined event such as the encryption key update processing by the subsystem 110 even when the authentication method that is set in the communication apparatus is WPA2-Enterprise.

Third Embodiment

In the third embodiment, an example of operation is described in a case that the communication apparatus 100 is an image forming apparatus, which is an example of an electronic device.

Figure 5:
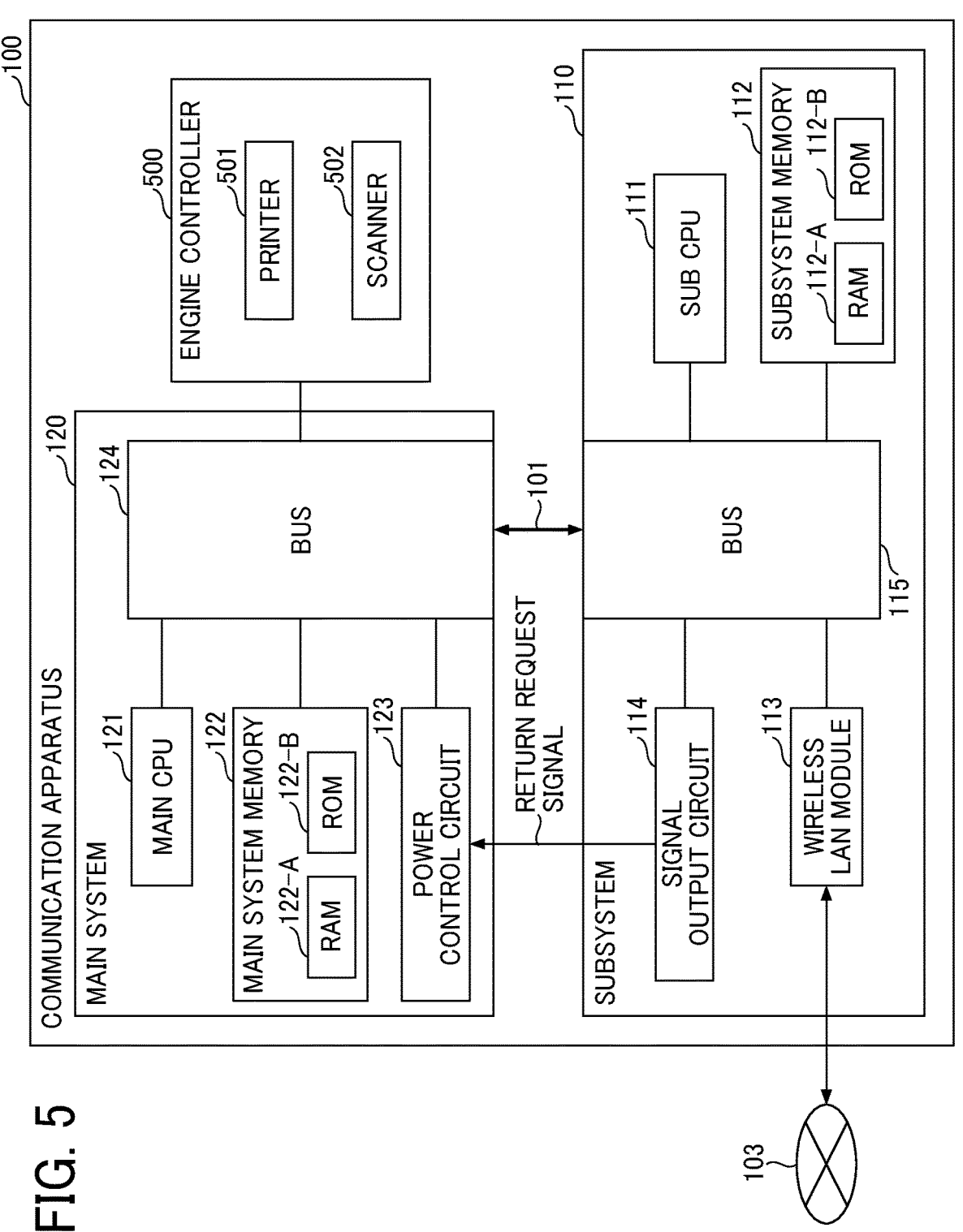
FIG. 5 is a diagram illustrating an example of a hardware configuration of the communication apparatus, according to the third embodiment of the present disclosure.

Hardware Configuration:

FIG. 5 is a diagram illustrating an example of a hardware configuration of the communication apparatus 100 according to the third embodiment. As illustrated in FIG. 5, the communication apparatus 100 according to the third embodiment includes an engine controller 500 in addition to the hardware components of the communication apparatus 100 according to an embodiment as illustrated in FIG. 1.

The engine controller 500 includes a printer 501 and a scanner 502. The printer 501 is a printing device that prints printing data on a recording medium. The scanner 502 is a reading device that scans a document, for example. The engine controller 500 controls the printer 501 and the scanner 502 in accordance with instructions from the main system 120.

Figure 6:
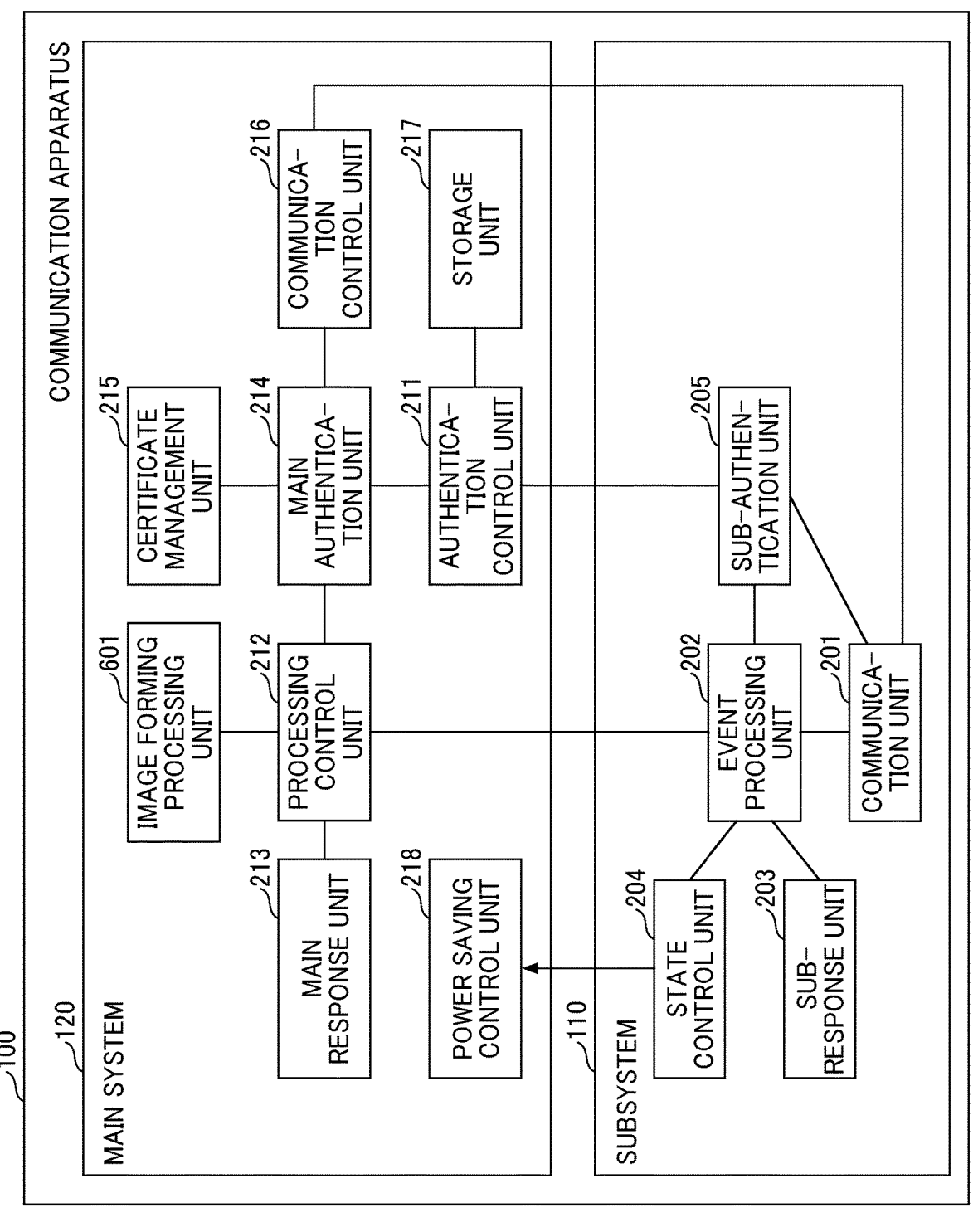
FIG. 6 is a diagram illustrating an example of a functional configuration of the communication apparatus, according to the third embodiment of the present disclosure.

Functional Configuration:

FIG. 6 is a diagram illustrating an example of a functional configuration of the communication apparatus 100 according to the third embodiment. As illustrated in FIG. 6, the communication apparatus 100 according to the third embodiment includes an image forming processing unit 601 in addition to the functional units of the communication apparatus 100 according to an embodiment as illustrated in FIG. 2.

The image forming processing unit 601 is implemented by, for example, the main CPU 121 executing the predetermined program loaded from the main system memory 122. The image forming processing unit 601 controls the engine controller 500 in accordance with a received image processing request, to perform image formation processing such as printing, scanning, and copying.

Figure 7:
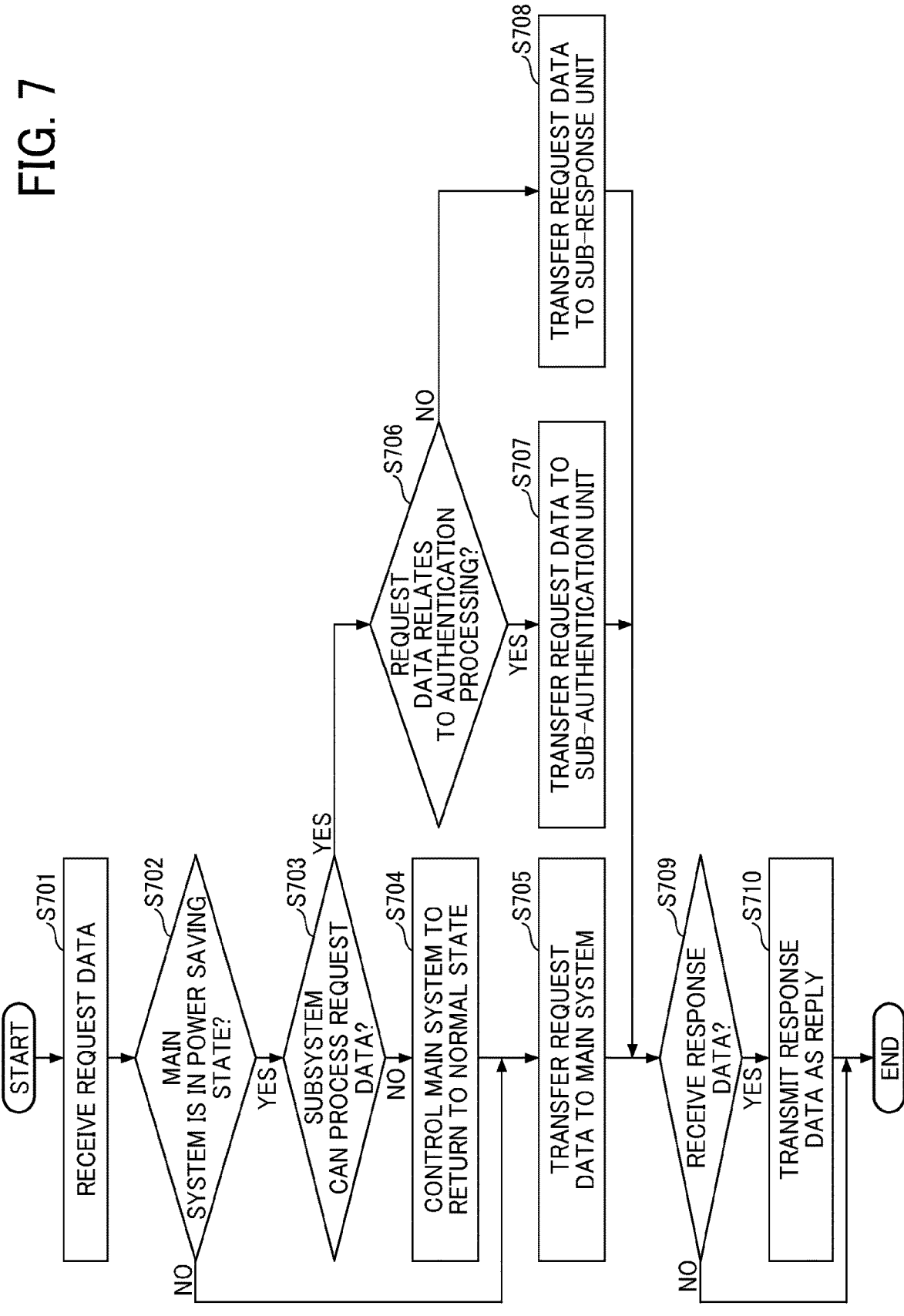
FIG. 7 is a flowchart illustrating an example of operation performed by an event processing unit, according to the third embodiment of the present disclosure.

Operation:

Processing of Event Processing Unit:

FIG. 7 is a flowchart illustrating an example of operation performed by the event processing unit 202, according to the third embodiment. This operation is an example of operation performed by the event processing unit 202 when the communication unit 201 of the subsystem 110 receives a data frame.

When the communication unit 201 receives a data frame (referred to hereinafter as a "request data") in step S701, the event processing unit 202 performs processes of step S702 and subsequent steps.

In step S702, the event processing unit 202 determines whether the main system 120 is in the power saving state. When the main system 120 is not in the power saving state (S702: NO), the operation by the event processing unit 202 proceeds to step S705. By contrast, when the main system 120 is in the power saving state (S702: YES), the operation by the event processing unit 202 proceeds to step S703.

In step S703, the event processing unit 202 determines whether the subsystem 110 can process the request data received by the communication unit 201. Examples of the request data that the subsystem 110 can process include, but are not limited to, authentication request data that the sub-authentication unit 205 can process and inquiry request data to which the sub-response unit 203 can respond. When the request data received by the communication unit 201 is data that the subsystem 110 cannot process (S703: NO), the operation by the event processing unit 202 proceeds to step S704. By contrast, when the request data received by the communication unit 201 is data that the subsystem 110 can process (S703: YES), the operation by the event processing unit 202 proceeds to step S706.

In step S704, the event processing unit 202 causes the state control unit 204 to control the main system 120 to transition to the normal state.

In step S705, the event processing unit 202 transfers the request data received by the communication unit 201 to the processing control unit 212 of the main system 120.

On the other hand, when the operation proceeds from step S703 to step S706, the event processing unit 202 determines whether the request data received by the communication unit 201 is request data relating to authentication processing. When the request data received by the communication unit 201 is request data relating to authentication processing (S706: YES), the operation by the event processing unit 202 proceeds to step S707. By contrast, when the request data received by the communication unit 201 is data other than request data relating to authentication processing (S706: NO), the operation by the event processing unit 202 proceeds to step S708.

In step S707, the event processing unit 202 transfers the request data to the sub-authentication unit 205. In one example, when the event processing unit 202 performs this transfer processing, the event processing determines that the predetermined event occurs in step S309 in FIG. 3.

In step S708, the event processing unit 202 transfers the request data to the sub-response unit 203. In response to receiving the request data, the sub-response unit 203 creates a data frame (referred to hereinafter as "response data") that responds to the request data, and sends the created response data to the event processing unit 202, for example.

In step S709, the event processing unit 202 determines whether the event processing unit receives response data from the request data receiver to which the event processing unit has transferred the request data. When the event processing unit 202 receives no response data (S709: NO), the operation of FIG. 7 ends. By contrast, when the event processing unit 202 receives response data (S709: YES), the operation proceeds to step S710.

In step S710, the event processing unit 202 causes the communication unit 201 to send the received response data to the request data sender from which the event processing unit has received the request data.

Figure 8:
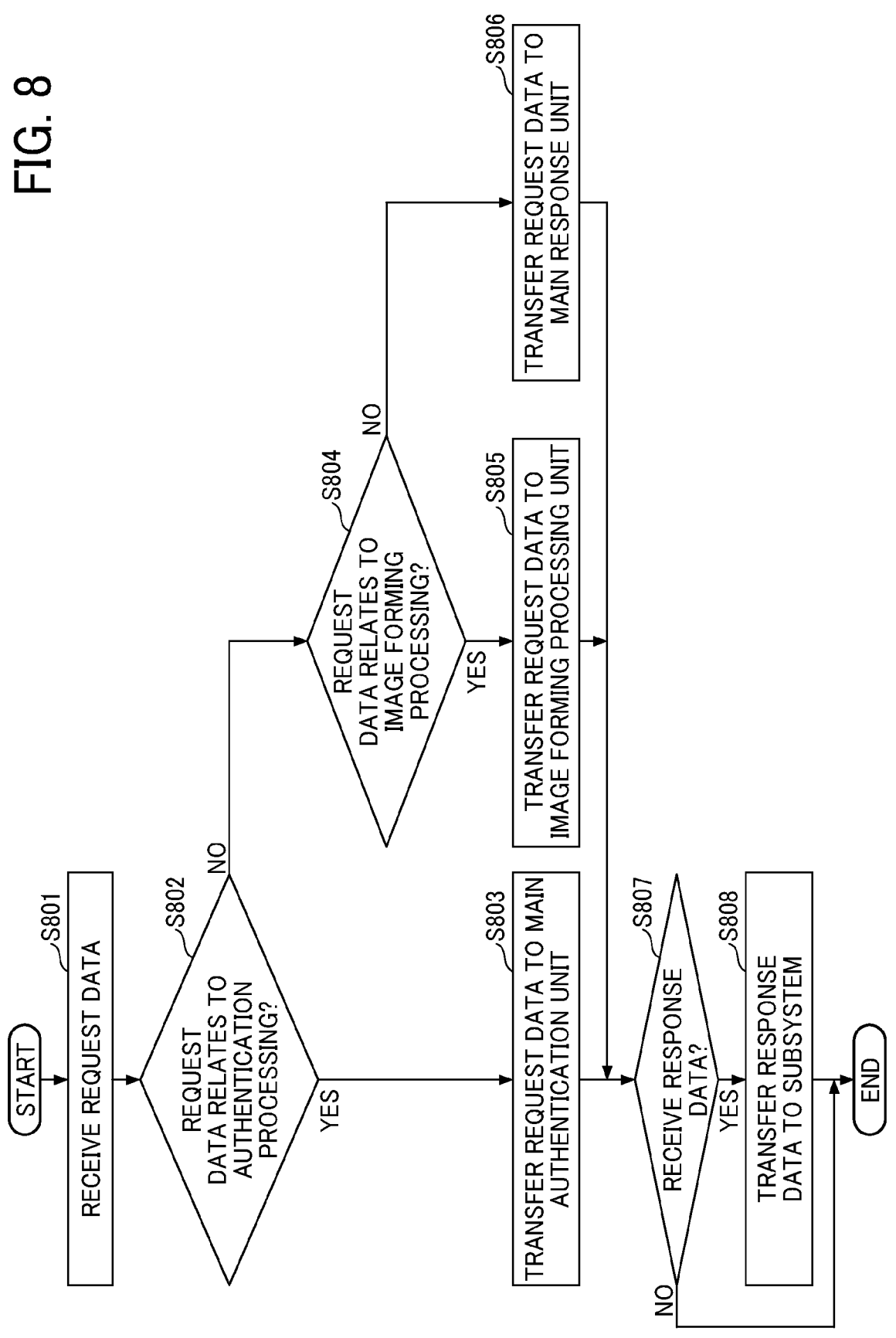
FIG. 8 is a flowchart illustrating an example of operation performed by a processing control unit, according to the third embodiment of the present disclosure.

Operation by Processing Control Unit:

FIG. 8 is a flowchart illustrating an example of operation performed by the processing control unit 212, according to the third embodiment. This operation is an example of operation performed by the processing control unit 212 of the main system 120 when the processing control unit 212 receives the request data from the event processing unit 202 of the subsystem 110.

In step S801, when the processing control unit 212 receives the request data from the event processing unit 202 of the subsystem 110, the processing control unit 212 performs processes of step S802 and subsequent steps.

In step S802, the processing control unit 212 determines whether the received request is request data relating to authentication processing. When the received request data is request data relating to authentication processing (S802: YES), the operation by the processing control unit 212 proceeds to step S803. By contrast, when the received request data is data other than request data relating to authentication processing (S802: NO), the operation by the processing control unit 212 proceeds to step S804.

In step S803, the processing control unit 212 transfers the request data to the main authentication unit 214. When the request data is, for example, a data frame for key exchange, the main authentication unit 214 performs encryption key update processing.

On the other hand, when the operation proceeds from step S802 to step S804, the processing control unit 212 determines whether the request data is request data relating to image forming processing. When the request data is request data relating to image forming processing (S804: YES), the operation by the processing control unit 212 proceeds step S805. By contrast, when the request data is data other than request data relating to image forming processing (S804: NO), the operation by the processing control unit 212 proceeds step S806.

In step S805, the processing control unit 212 transfers the request data to the image forming processing unit 601. In response to receiving the request data, the image forming processing unit 601 performs the requested image formation processing based on the request data. Further, the image forming processing unit 601 creates response data that responds to the request data, and sends the created response data to the processing control unit 212.

In step S806, the processing control unit 212 transfers the request data to the main response unit 213. In response to receiving the request data, the main response unit 213 performs corresponding processing to create response data that responds to the request data, and sends the created response data to the processing control unit 212.

In step S807, the processing control unit 212 determines whether the processing control unit receives response data from the request data receiver to which processing control unit has transferred the request data. When the processing control unit 212 receives no response data (S807: NO), the operation of FIG. 8 ends. By contrast, when the processing control unit 212 receives response data (S807: YES), the operation proceeds to step S808.

In step S808, the processing control unit 212 transfers the received response data to the event processing unit 202 of the subsystem 110.

With the operation FIG. 8 and FIG. 9, the communication apparatus 100 performs the operation by the communication apparatus 100 according to the first embodiment and the second embodiment, and further causes the main system 120 to transition to the normal state and to perform image forming processing in response to receiving the request data of image forming processing. The image forming processing performed by the main system 120 is another example of the predetermined function that the communication apparatus 100 can perform in the normal state.

With the configurations and operations described above, according to each of the embodiments of the present disclosure, in the communication apparatus 100 including the main system 120 and the subsystem 110, the number of the main system's transition from the power saving state to the normal state is reduced in response to the predetermined event such as the encryption key update processing.

The embodiments described above are merely examples, and variations and modifications can be made to the communication apparatus 100. For example, the communication apparatus 100 according to the third embodiment are any suitable electronic apparatuses, in alternative to the image forming apparatus. For example, when the communication apparatus 100 is a projector, the communication apparatus 100 includes an image projection unit instead of the engine controller 500 in FIG. 5, and an image projection processing unit instead of the image forming processing unit 601 in FIG. 6.

Although in the first to third embodiments, the description given above is of an example in which the event processing unit 202 implemented by the program executed by the sub CPU 111 determines the transfer destination to which the received data frame is to be transferred, this is merely one example. In another example, the subsystem 110 includes a filtering unit (hardware) that analyzes received data frames, to discard unnecessary data frames and distribute the received data frames.

Further, in the first to third embodiments, the description given above is of an example in which the communication apparatus 100 connects to the network 103 using the wireless LAN module 113, this is merely one example. In another example, the communication apparatus 100 connects to the network 103 using a network interface card (NIC).

In this specification, a communication apparatus, a communication method, and a storage medium according to several examples are disclosed.

According to a first example of the present disclosure, a communication apparatus includes a main system configured to perform first authentication processing and a subsystem configured to perform second authentication processing. The main system includes an authentication control unit configured to control the main system or the subsystem to perform authentication processing for connecting to a network. The main system includes a power saving control unit configured to control the main system to transition to a power saving state, in which the communication apparatus consumes power that is lower than power consumed when the communication apparatus is in a normal state, in which the main system performs the first authentication processing. The subsystem includes a communication unit configured to transmit and receive data through the network. The subsystem includes an event processing unit configured to, in response to occurrence of a predetermined event relating to connection to the network when the main system is in the power saving state, process the predetermined event without controlling the main system to transition to the normal state.

According to a second example of the present disclosure, in the communication apparatus of the above first example, the authentication control unit controls the subsystem to perform the second authentication processing. The predetermined event includes an encryption key update processing relating to the second authentication processing.

According to a third example of the present disclosure, in the communication apparatus of the above first or second example, the second authentication processing performed by the subsystem includes an encryption key update processing performed using an authentication method that does not require processing relating to a digital certificate.

According to a fourth example of the present disclosure, in the communication apparatus of the above first example, the authentication control unit controls the main system to perform the first authentication processing. The main system shares authentication information created in the first authentication processing with the subsystem. The predetermined event includes an encryption key update processing relating to the first authentication processing.

According to a fifth example of the present disclosure, in the communication apparatus of the above fourth example, the authentication information includes a pre-shared key and a data frame encryption key.

According to a sixth example of the present disclosure, in the communication apparatus of any one of the above first to fifth examples, the subsystem includes a state control unit configured to control the main system to transition to the normal state in response to occurrence of an event that cannot be processed by the subsystem when the main system is in the power saving state.

According to a seventh example of the present disclosure, in the communication apparatus of any one of the above first to sixth examples, the power saving control unit controls the main system to transition to the power saving state after at least one of the main system and the subsystem performs the authentication processing for connecting to the network.

According to an eighth example of the present disclosure, in the communication apparatus of any one of the above first to seventh examples, the network includes a wireless local area network (LAN).

According to a ninth example of the present disclosure, a communication method is performed by a communication apparatus including a main system configured to perform first authentication processing and a subsystem configured to perform second authentication processing. The method includes controlling, by the main system, the main system or the subsystem to perform authentication processing for connecting to a network. The method includes controlling, by the main system, the main system to transition to a power saving state, in which the communication apparatus consumes power that is lower than power consumed when the communication apparatus is in a normal state, in which the main system performs the first authentication processing. The method includes transmitting and receiving, by the subsystem, data through the network. The method includes, in response to occurrence of a predetermined event relating to connection to the network when the main system is in the power saving state, processing, by the subsystem, the predetermined event without controlling the main system to transition to the normal state.

According to a tenth example of the present disclosure, a storage medium storing a program storing instruction is provided, which, when executed by one or more processors of a communication apparatus including a main system configured to perform first authentication processing and a subsystem configured to performing second authentication processing, to perform a method. The method includes controlling, by the main system, the main system or the subsystem to perform authentication processing for connecting to a network. The method includes controlling, by the main system, the main system to transition to a power saving state, in which the communication apparatus consumes power that is lower than power consumed when the communication apparatus is in a normal state, in which the main system performs the first authentication processing. The method includes transmitting and receiving, by the subsystem, data through the network. The method includes, in response to occurrence of a predetermined event relating to connection to the network when the main system is in the power saving state, processing, by the subsystem, the predetermined event without controlling the main system to transition to the normal state.

According to an eleventh example of the present disclosure, a communication apparatus includes a main system and a subsystem. The communication apparatus includes a network interface to connect the communication apparatus to a wireless network. The communication apparatus includes a storage unit configured to store a setting of one authentication method used by the communication apparatus to connect to the wireless network among a plurality of authentication methods for connecting to the wireless network. The plurality of authentication methods includes an authentication method that requires processing relating to a digital certificate and an authentication method that does not require the processing relating to the digital certificate. The main system includes a power saving control unit configured to control the main system to transition to a power saving state in which the communication apparatus consumes power that is lower than power consumed when the communication apparatus is in a normal state at a predetermined timing. The subsystem includes an event processing unit configured to, in response to receiving a data frame for key exchange of an encryption key through the wireless network when the main system is in the power saving state, control the main system or the subsystem to perform key exchange of an encryption key based on the data frame. The event processing unit controls the subsystem to perform the key exchange of the encryption key based on the received data frame in a case that the setting of the one authentication method set in the storage unit is the authentication method that does not require processing relating to the digital certificate. In a case that the setting of the one authentication method set in the storage unit is the authentication method that does not require processing relating to the digital certificate, the event processing unit controls the main system to transition from the power saving state to the normal state, and transmits the received data frame to the main system to cause the main system to perform the key exchange of the encryption key based on the received data frame.

According to a twelfth example of the present disclosure, in the communication apparatus of the above eleventh example, the main system further includes a first authentication unit configured to perform the processing relating to the key exchange of the encryption key based on the data frame transmitted from the event processing unit. The subsystem further includes a second authentication unit configured to perform the processing relating to the key exchange of the encryption key based on the received data frame.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

REFERENCE SIGNS LIST

100 Communication apparatus
103 Network
110 Subsystem
120 Main system
201 Communication unit
202 Event processing unit
204 State control unit
205 Sub-authentication unit (second authentication unit)
211 Authentication control unit
212 Processing control unit
214 Main authentication unit (first authentication unit)
217 Storage unit
218 Power saving control unit

The invention claimed is:

1. A communication apparatus, comprising:
a main system to perform first authentication processing; and
a subsystem to perform second authentication processing, wherein
the main system includes power saving control circuitry configured to control the main system to transition to a power saving state, the power saving state in which the communication apparatus consumes power that is lower than power consumed when the communication apparatus is in a normal state, and the normal state in which the main system performs the first authentication processing,
the subsystem includes:
communication circuitry configured to transmit and receive data through a network, and
processing circuitry configured to determine whether the subsystem can process a packet of the data received by the communication circuitry, when the main system is in the power saving state,
the first authentication processing is for joining the network with a first authentication method which utilizes a digital certificate,
the second authentication processing is for joining the network with a second authentication method which utilizes a secure password, the second authentication method different from the first authentication method, and
when the processing circuitry determines that the subsystem can process the packet of the data received by the communication circuitry due to the packet relating to the second authentication method, the processing circuitry processes the packet of the data without controlling the main system to transition to the normal state.

2. The communication apparatus of claim 1,
the processing of the packet by the processing circuitry includes performing an encryption key update processing relating to the second authentication processing.

3. The communication apparatus of claim 1, wherein the second authentication method, used by the subsystem to perform the second authentication processing, does not require processing relating to a digital certificate.

4. The communication apparatus of claim 1, further comprising:
authentication control circuitry configured to control the main system to perform the first authentication processing, and
the main system shares authentication information created in the first authentication processing with the subsystem.

5. The communication apparatus of claim 4, wherein when the authentication information has been shared with the subsystem by the main system, the processing circuitry determines that the subsystem can process the packet of the data received by the communication circuitry when the packet is related to performance of an encryption key update using the authentication information.

6. The communication apparatus of claim 4, wherein the authentication information includes a pre-shared key and a data frame encryption key.

7. The communication apparatus of claim 1, wherein the subsystem includes state control circuitry configured to control the main system to transition to the normal state in response to the processing circuitry having determined that the packet of the data received by the communication circuitry cannot be processed by the subsystem.

8. The communication apparatus of claim 1, wherein the power saving control circuitry controls the main system to transition to the power saving state in response to at least one of the first authentication processing being performed by the main system, and the second authentication processing is performed by the subsystem.

9. The communication apparatus of claim 1, wherein the network includes a wireless local area network (LAN).

10. The communication apparatus of claim 1, wherein the processing circuitry determines that the subsystem can process the packet of the data received by the communication circuitry when the packet is related to the second authentication processing.

11. The communication apparatus of claim 1, wherein the first authentication method used by the main system to perform the first authentication processing requires processing the digital certificate.

12. The communication apparatus of claim 11, wherein the processing circuitry determines that the subsystem cannot process the packet of the data received by the communication circuitry when the packet is related to an encryption key update processing relating to the first authentication processing and controls the main system to transition to the normal state.

13. The communication apparatus of claim 1, wherein
  the subsystem includes sub-authentication circuitry configured to perform the second authentication processing, and
  the sub-authentication circuitry is maintained in an inactive state when the main system is in the normal state.

14. A communication method, comprising:
  controlling, by a main system, the main system to transition to a power saving state, the power saving state in which a communication apparatus consumes power that is lower than power consumed when the communication apparatus is in a normal state, and the normal state in which the main system performs a first authentication processing;
  transmitting and receiving, by a subsystem which performs a second authentication processing, data through a network;
  determining, by the subsystem, whether the subsystem can process a packet of the received data, when the main system is in the power saving state, wherein the first authentication processing is for joining the network with a first authentication method which utilizes a digital certificate, and the second authentication processing is for joining the network with a second authentication method which utilizes a secure password, the second authentication method different from the first authentication method; and
  when the determining indicates that the subsystem can process the packet of the received data due to the packet relating to the second authentication method, processing, by the subsystem, the packet of the data without controlling the main system to transition to the normal state.

15. A non-transitory computer readable storage medium storing a program including instruction, which, when executed by one or more processors of a communication apparatus to perform a method comprising:
  controlling, by a main system of the communication apparatus, the main system to transition to a power saving state, the power saving state in which the communication apparatus consumes power that is lower than power consumed when the communication apparatus is in a normal state, and the normal state in which the main system performs a first authentication processing;
  transmitting and receiving, by a subsystem of the communication apparatus which performs a second authentication processing, data through the network;
  determining, by the subsystem, whether the subsystem can process a packet of the received data, when the main system is in the power saving state, wherein the first authentication processing is for joining the network with a first authentication method which utilizes a digital certificate, and the second authentication processing is for joining the network with a second authentication method which utilizes a secure password, the second authentication method different from the first authentication method; and
  when the determining indicates that the subsystem can process the packet of the received data due to the packet relating to the second authentication method, processing, by the subsystem, the packet of the data without controlling the main system to transition to the normal state.

* * * * *